United States Patent [19]
Olmr

[11] Patent Number: 5,555,961
[45] Date of Patent: Sep. 17, 1996

[54] ON THE GO GEAR SHIFTER

[76] Inventor: Jaroslav J. Olmr, 2919 N. 8th St., Sheboygan, Wis. 53083

[21] Appl. No.: 433,264

[22] Filed: May 2, 1995

[51] Int. Cl.$^6$ .............................. B60K 41/22; G05G 9/02
[52] U.S. Cl. ...................... 192/3.62; 74/475; 74/471 XY
[58] Field of Search ................................ 192/3.51, 3.54, 192/3.61, 3.62, 3.63; 74/471 R, 473 R, 475, 471 XY

[56] References Cited

U.S. PATENT DOCUMENTS

| | | | |
|---|---|---|---|
| 4,671,378 | 6/1987 | Korrect et al. ................. | 74/471 XY X |
| 4,676,350 | 6/1987 | Shinokawa et al. ................. | 192/3.62 |
| 4,844,227 | 7/1989 | Crawford et al. ................. | 192/3.54 |
| 4,939,948 | 7/1990 | Stittle ................................. | 74/473 R |

Primary Examiner—Richard M. Lorence
Attorney, Agent, or Firm—Burns, Doane, Swecker & Mathis, L.L.P.

[57] ABSTRACT

An on-the-go gear shifter includes a control handle movable along a slot to change gear ratios. The control handle has an upper part and a lower part hinged to the upper part. Detent openings connect with the slot for retaining the control handle in a selected position. A shaft underlays the slot in parallel relationship to the detent openings. The lower part of the control handle is mounted from the shaft for rotation about its axis, with the hinge axis at right angles to the shaft axis. A thrust collar is disposed on the shaft for axial movement. A thrust surface is provided on the upper part of the control handle. Movement of the control handle to disengage it from a detent opening causes the thrust surface to urge the thrust collar along the shaft axis. A first link translates the movement of the thrust collar for the control of the clutch of the appliance. A second link connects the control handle to the gear box for changing the gear ratio as the control handle rotates about the axis of the shaft.

10 Claims, 2 Drawing Sheets

FIG. 1
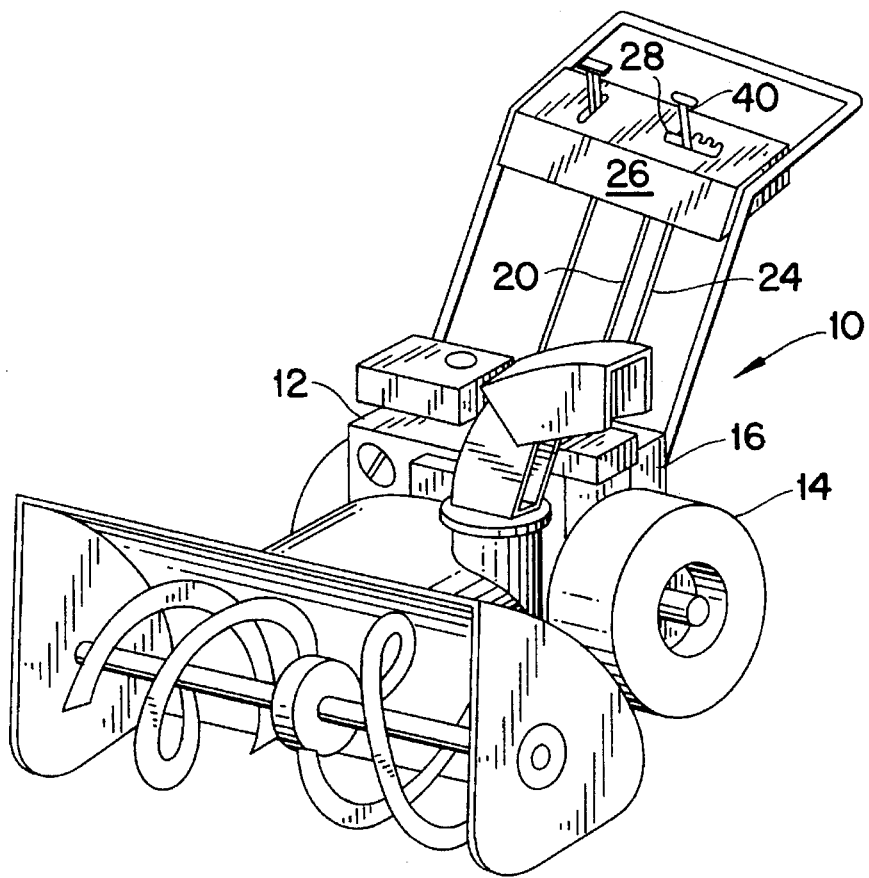
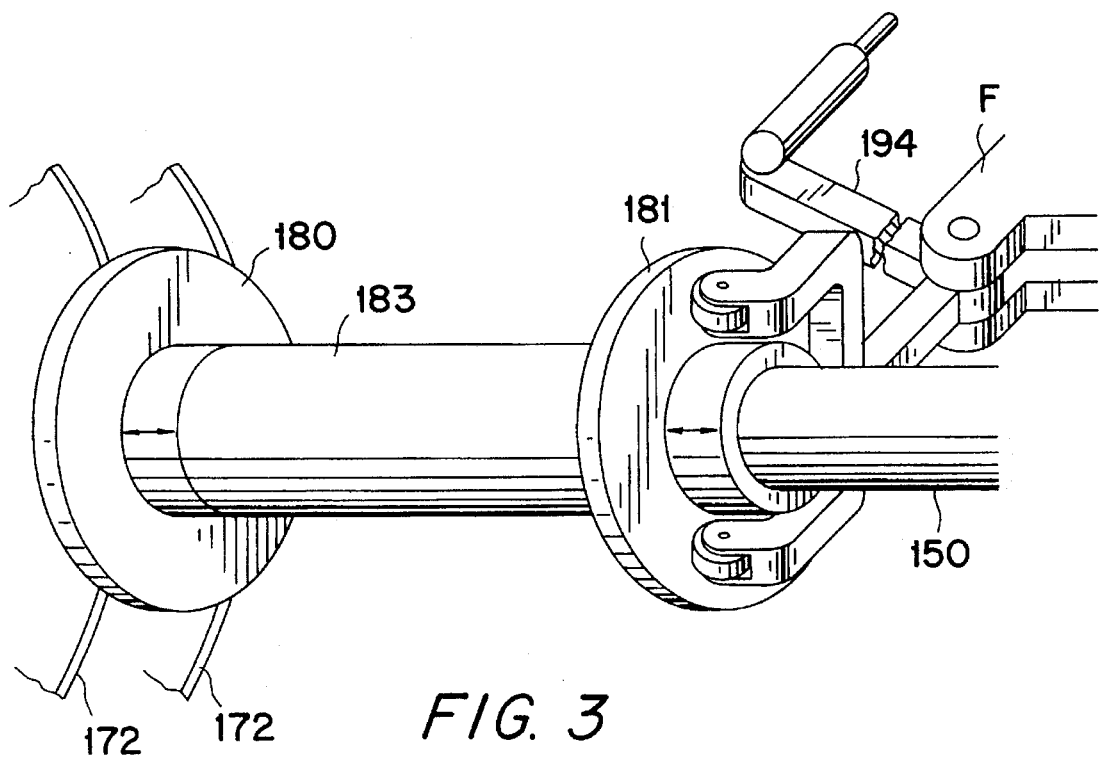
FIG. 3

ON THE GO GEAR SHIFTER

FIELD OF INVENTION

This invention relates to improvements to an on-the-go gear shifter. Such shifters are typically employed in small mechanized appliances such as snow blowers and garden tractors, but the invention is not limited to this use.

BACKGROUND OF INVENTION

On-the-go gear shifters permit the simultaneous de-clutching of a drive train of an apparatus when changing gear with a single control handle. The control handle is constrained to travel in an elongated slot in communication with which a plurality of detent openings are formed in orthogonal relationship to the axis of the slot. When the control handle is engaged in a detent opening, the clutch function is engaged. When the shift lever is disengaged from the detent opening whereby it can travel lengthwise along the slot to change gear ratios, the action of disengaging the control handle from the detent opening automatically serves to disengage the clutch for such time as the control handle is positioned in the slot.

Various mechanisms have been proposed in the past for translating the X-Y movement of the control handle for the control of the gear ratio and the clutch function, one such mechanism being disclosed in U.S. Pat. No. 4,939,948. Generally speaking, it is preferred for economic reasons that the movement in both the X and the Y directions is rotary. The rotary movement in the X direction (which is here considered to be the direction of alignment of the detent openings) also permits the relatively small degree of movement of the control handle to and from the detent openings to be amplified merely by increasing the length of the handle on the end thereof opposite to the manually actuated end. However, this arrangement is not always possible due to spatial constraints.

In the above mentioned patent, the motion of the control handle in the X direction is transmitted to a clutch actuator by means of an intermediate arm on which an appreciable twisting stress about the Z axis may be generated, which necessitates a construction of increased strength and cost.

It is an object of this invention to provide on-the-go gear shifters wherein the parts can be readily arranged to meet spatial restraints.

It is another object of this invention to provide an on-the-go gear shifter wherein the declutching movement of the control handle may be arranged so as to be in or close to a balance, whereby the parts may be more lightly structured and be more economically produced.

SUMMARY OF THE INVENTION

In accordance with the invention, an on-the-go gear shift arrangement for a mechanized apparatus including a control handle, an elongated slot along which the control handle is movable to change gear ratios and a plurality of detent openings in communication with the slot for retaining the control handle in fixed gear positions is characterized wherein the control handle comprises a finger portion and a control rod portion, with a hinge connecting the portions together. A shaft is disposed beneath the slot to extend in parallel relationship with the detent openings. The finger portion is mounted to the shaft for rotation about the shaft axis, with the hinge axis at right angles to the shaft axis. A thrust collar is disposed on the shaft for axial movement, and a thrust surface means is disposed on the control rod portion of the control lever proximate the thrust collar for applying a force to the thrust collar as the control handle is moved out of a detent opening to cause the thrust collar to move in an axial direction. A first link means is provided for transmitting the axial movement of the thrust collar to the clutch of the apparatus, and a second link means for connecting the control handle to the gear box of the apparatus.

The thrust collar has axially opposed faces upon which the thrust surface means and the first link means respectively bear. The faces may be closely adjacent or widely spaced apart by using suitable spacer means, so that the first link means may be disposed at any convenient location along the shaft.

Suitably and preferably, the means comprises a pair of cam surfaces disposed on diametrically opposed sides of the thrust collar, or proximate thereto, so as to reduce the generation of twisting stresses on both the thrust surface means and the thrust collar and the shaft. This permits the thrust surface means to be folded from sheet metal, with cam surfaces formed along the edges of the metal sheet. The thrust surface means of this nature may also be structured to transmit forces between the control rod portion and the finger portion of the control handle to delocalize stresses in these parts.

Also suitably and preferably, the first link means has a forked end which contacts the thrust collar so as to transmit a torsionally balanced force therebetween. Also suitably and preferably, the thrust collar is mounted for rotation about the shaft axis, and the forked end with rolling surfaces where it contacts the thrust collar. Accordingly, when the thrust surface means is applying a declutching force to the thrust collar and the control handle is rotated about the shaft to change gear ratios, the thrust collar will rotate together with the thrust surface means to reduce frictional wear.

It is generally preferred for simplicity that the shaft is retained in axially fixed position, with the thrust collar slidable therealong. However, other arrangements may be preferable, particularly where it is desired that the shaft serve another function.

The foregoing objects and aspects of the invention, together with other objects, aspects and advantages thereof will be more apparent from a consideration of the following description of the preferred embodiment thereof taken in conjunction with the drawings annexed hereto.

BRIEF DESCRIPTION OF THE DRAWINGS

FIG. 1 is a simplified view of a snow blower in which the on-the-go gear shifter may be incorporated;

FIG. 3 is a view of the right hand side portion of FIG. 2 incorporating a spacer element.

DESCRIPTION OF THE PREFERRED EMBODIMENT

Figure 2:
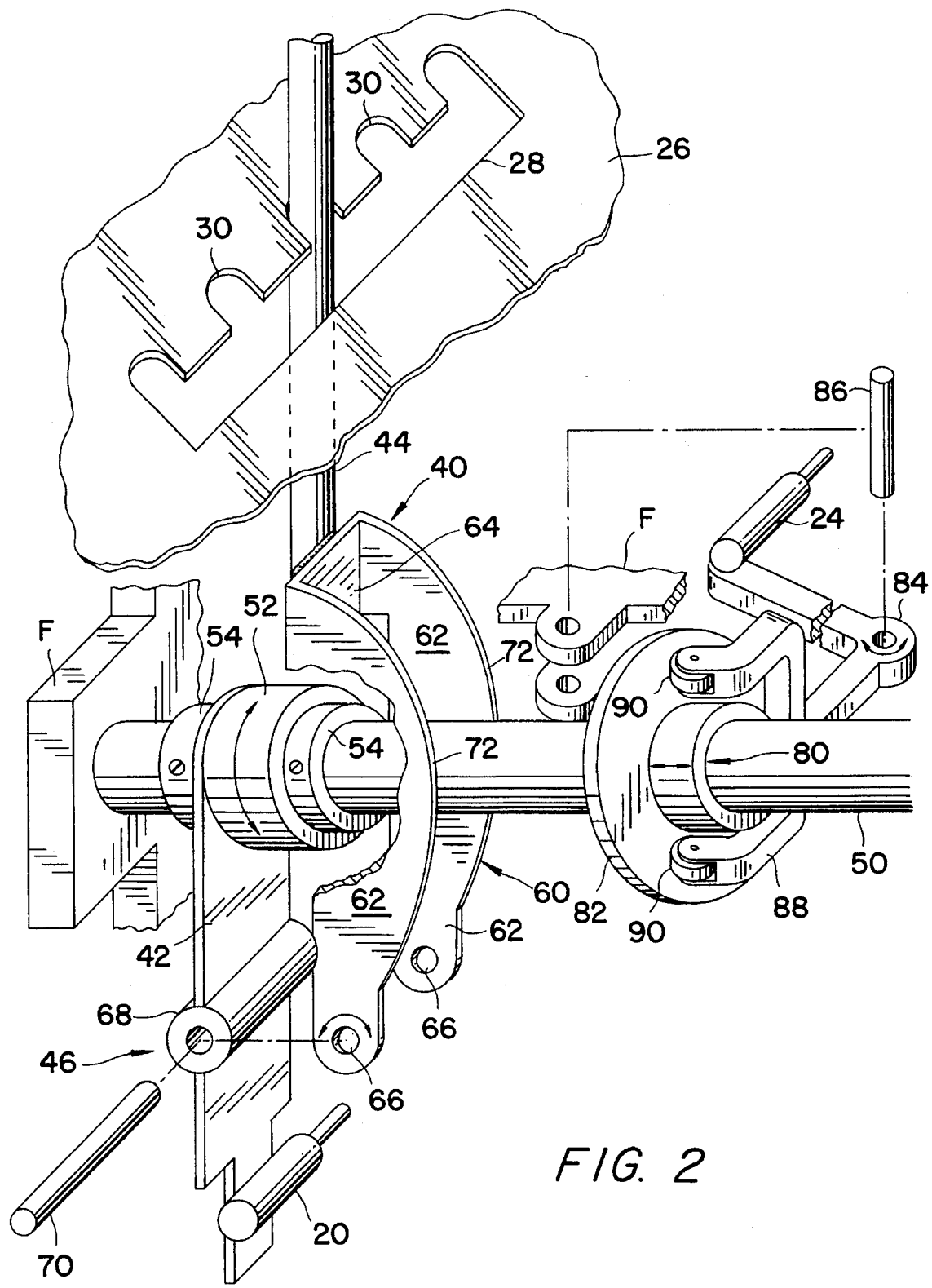
FIG. 2 is an exploded schematic view of the on-the-go gear shifter of the invention, cut away to reveal detail.

Considering the drawings in detail, a snow blower incorporating the on-the-go gear shifter of the invention is identified generally therein by the numeral 10. Snowblower 10 includes a prime mover, namely an engine 12, with wheels 14 and a drive train 16 connecting the engine to the wheels. Drive train 16 includes a gear box with a gear box control link 20 and a clutch with a clutch control link 24. Snow blower 10 includes a console panel 26 with an elongated opening 28 and a plurality of detent openings 30 at spaced apart intervals in communication with opening 28. A control handle 40 projects through opening 28. As thus far described, snowblower 10 is of a conventional nature.

Referring now to FIG. 2, the control handle 40 of the improved on-the-go gear shifter of the invention comprises a finger portion 42 and a control rod portion 44 connected together by a pivot 46. A shaft 50 is secured to a frame portion F of snow blower 10 to extend axially in underlaying parallel relationship with detent openings 30. Finger portion 42 of the control handle 40 is mounted for rotation about shaft 50 by a thimble 52, the axial position of which is fixed by stop collars 54 or any other convenient means. The lower end of control rod portion 44 is in the form of a bracket 60 conveniently formed from sheet metal, which bracket comprises a pair of cheeks 62 held in parallel spaced apart opposed relationship by a header 64. The lower end of each of cheeks 62 is provided with a gudgeon opening 66; a hinge bearing 68 is secured to finger portion 42, and a gudgeon pin 70 passing through the gudgeon openings and the hinge bearing forms the pivot 46 connecting the finger portion to the control rod portion 44 of the control handle 40, with cheeks 62 bracketing thimble 52. Cheeks 62 have edges 70 on one axial side thereof which are shaped to form axially outward cams 72.

A thrust collar 80 is mounted on shaft 50 for radial and axial movement with respect to the shaft axis. Although in FIG. 2 thrust collar 80 is shown in axially spaced apart relationship with cams 72, it will be appreciated that this is for clarity of illustration, and in practise, the parts will be positioned with the thrust surface 82 of the thrust collar in close proximity to the cams.

A lever arm 84 is pivotally mounted from frame F by a pintle 86. Lever arm 84 includes a forked end 88 with rollers 90 for transmitting a force between thrust surface 82 and the lever arm, and an opposed end to which clutch control link 24 is connected. Gear box control link 20 is connected to the lower end of finger portion 42.

Considering now the operation of the on-the-go gear shifter of the invention, the manual actuation of control handle 40 in a direction to move control rod portion 44 from a detent opening 30 will cause the control rod portion to rotate about pivot 46, thereby urging cams 72 towards the thrust surface 82 of the thrust collar 80, causing the thrust collar to slide along shaft 50, which movement is transmitted via lever arm 84 to clutch control link 24. It will be understood that the clutch will normally be spring biased, and that this biasing force will be transmitted via clutch control link 24 to lever arm 84, to resist the movement of the control handle 40 from a detent opening 30. However, this biasing force may be supplemental to or replaced by other equivalent biasing forces as are desired or appropriate for the apparatus to be controlled. It will also be understood that cams 72 will be shaped so as to contact thrust surface 82 on or close to a diameter thereof, so as to transmit a torsionally balanced force between the cams and the thrust collar 80.

Assuming now that control handle 40 is urged out of a detent opening 30, the handle may be positioned as desired along the length of elongated opening 28. This positioning force is transmitted via cheeks 62 and pivot 46 to finger portion 42, causing the finger portion to rotate about shaft 50, and a desired movement of gear box control link 20 to change the gear ratio. This rotary movement of the gear shift lever about shaft 50 will engender a corresponding rotation of the cams 72 about the shaft 50. Since thrust collar 80 is free to rotate about the axis of shaft 50, it will tend to undergo a rotary movement in unison with the cams 72, to avoid frictional wear. Similarly, frictional wear between the thrust collar 80 and lever arm 84 is reduced by rollers 90.

Referring now to FIG. 3, a modification of the on-the-go gear shift mechanism of FIG. 2 comprises a shaft 150 on which a thrust collar 180 is mounted for actuation by cams 172 in a wholly analogous manner to parts 50, 80 and 82 of FIG. 2. The modification of FIG. 3 comprises an auxiliary thrust collar 181 spaced apart from thrust collar 180 by a spacer 183, with lever arm 184 contacting the auxiliary thrust collar. Accordingly, actuation of the cams 172 in a similar manner to the actuation of cams 72 will cause the actuation of lever arm 184 in an analogous manner to lever arm 84.

It will be apparent that many changes may be made to the illustrative embodiment while falling within the scope of the invention, and it is intended that all such changes be covered by the claims appended hereto.

I claim:

1. A mechanized apparatus including a prime mover, a driven member, a drive train including a gear box and a clutch for connecting said prime mover to said driven member; an on-the-go gear shifter including a control handle for changing gear ratios and for simultaneously actuating said clutch to disengage said driven member; an elongated slot for constraining the movement of said control handle along which said control handle is movable to change gear ratios, and a plurality of detent openings communicating with said slot for retaining said control lever in fixed gear positions;

wherein said control handle comprises a finger portion, and a control rod portion, and a hinge connecting said finger portion to said control rod portion; said hinge having an axis of rotation;

a shaft disposed beneath said slot to extend in parallel relationship with said detent openings, said shaft having an axis therealong;

means mounting said finger portion from said shaft for rotation about the axis thereof with said hinge axis transverse to the direction of said shaft axis;

a thrust collar mounted on said shaft for axial movement;

thrust surface means disposed on said control rod portion proximate said thrust collar for applying a force to said thrust collar as said control lever is moved from engagement in a detent opening into said slot to cause said thrust collar to move in an axial direction;

first link means for transmitting said axial movement of said thrust collar to said clutch for the control thereof;

second link means for connecting said control handle to said gear box for the control thereof.

2. An apparatus as defined in claim 1 wherein said thrust surface means comprises a pair of cam surfaces disposed on diametrically opposed sides of said thrust collar.

3. An apparatus as defined in claim 2 wherein said thrust surface means is folded from sheet metal and wherein said cam surfaces are formed as edge profiles to said sheet metal.

4. An apparatus as defined in claim 1 wherein said thrust collar has axially opposed faces upon which said thrust surface means and said first link means respectively bear in torsionally balanced relationship.

5. An apparatus as defined in claim 4 wherein said axially opposed faces are spaced apart by tubular spacer mounted on said shaft.

6. An apparatus as defined in claim 1 wherein said first link means comprises a lever having a forked end for contacting said thrust collar.

7. An apparatus as defined in claim 6 wherein said forked end is provided with roller means for contacting said thrust collar.

8. An apparatus as defined in claim 7 wherein said thrust collar is mounted for rotation about the axis of said shaft.

9. An apparatus as defined in claim 1 wherein said second link means is connected to said finger portion of said control handle.

10. An apparatus as defined in claim 1 wherein said shaft is axially fixed in position.

* * * * *